United States Patent
Maughan et al.

(10) Patent No.: US 10,075,751 B2
(45) Date of Patent: *Sep. 11, 2018

(54) METHOD AND SYSTEM FOR VERIFYING SCHEDULED MEDIA ASSETS

(71) Applicant: Rovi Guides, Inc., Santa Clara, CA (US)

(72) Inventors: Benjamin H. Maughan, Pleasanton, CA (US); Brandon Conley, Wynnewood, PA (US); Matthew Wildrick, Doylestown, PA (US); Bradley Smith, Hatfield, PA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,316

(22) Filed: Sep. 30, 2015

(65) Prior Publication Data

US 2017/0094330 A1  Mar. 30, 2017

(51) Int. Cl.
| | | |
|---|---|---|
| H04H 60/32 | (2008.01) | |
| H04N 21/24 | (2011.01) | |
| H04N 21/234 | (2011.01) | |
| H04N 21/4627 | (2011.01) | |
| H04N 21/8358 | (2011.01) | |

(52) U.S. Cl.
CPC ... *H04N 21/2407* (2013.01); *H04N 21/23418* (2013.01); *H04N 21/4627* (2013.01); *H04N 21/8358* (2013.01)

(58) Field of Classification Search
CPC ............ H04N 21/84; H04N 21/472; H04N 21/47214; H04N 21/4755; H04N 21/4788; H04N 21/4316; H04N 21/47202; H04N 21/4722; H04N 21/482; H04N 21/4826; H04N 21/4828; H04N 21/6581; H04H 60/29; H04H 60/31; H04H 60/32; H04H 60/33; H04H 60/37; H04H 60/372; H04H 60/377; H04H 60/48; H04H 60/46; H04H 60/59; H04H 60/74; H04H 60/72; H04H 60/73
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |

(Continued)

*Primary Examiner* — An Son Phi Huynh
(74) *Attorney, Agent, or Firm* — Haley Guiliano LLP

(57) ABSTRACT

Systems and methods are described herein for validating content scheduled to be transmitted from a content source. The system may generate a media fingerprint of the content that is transmitted during a specific time from a specific content source. The system may then compare the media fingerprint with media fingerprints in a database of known media assets. When a match is found, the system may retrieve a unique identifier associated with the matched fingerprint. The system may further determine a unique identifier associated with generated media fingerprint. The system may then compare the two identifiers and if the unique identifiers match the media asset is validated. If the unique identifiers do not match, a discrepancy is found and various actions may be taken in response.

16 Claims, 9 Drawing Sheets

(56) References Cited

U.S. PATENT DOCUMENTS

| | | | |
|---|---|---|---|
| 7,165,098 B1 | 1/2007 | Boyer et al. | |
| 7,454,443 B2* | 11/2008 | Ram | G06F 11/1453 |
| 7,761,892 B2 | 7/2010 | Ellis et al. | |
| 7,913,161 B2* | 3/2011 | Rivas, Jr. | G06F 17/2229 |
| | | | 715/229 |
| 8,046,801 B2 | 10/2011 | Ellis et al. | |
| 8,488,835 B2 | 7/2013 | Zhang | |
| 8,489,673 B2* | 7/2013 | Sebastian | H04L 12/1859 |
| | | | 709/203 |
| 8,499,256 B1* | 7/2013 | Iten | H04N 21/4821 |
| | | | 715/810 |
| 8,782,701 B2* | 7/2014 | Yu | H04N 5/44543 |
| | | | 725/39 |
| 9,392,324 B1* | 7/2016 | Maltar | G06F 17/30038 |
| 9,510,044 B1* | 11/2016 | Pereira | H04N 21/44008 |
| 9,699,504 B2* | 7/2017 | Maughan | H04N 21/44204 |
| 9,854,304 B2* | 12/2017 | Maughan | H04N 21/4415 |
| 2002/0174430 A1* | 11/2002 | Ellis | H04N 5/44543 |
| | | | 725/46 |
| 2003/0110499 A1 | 1/2003 | Knudson et al. | |
| 2003/0149988 A1* | 8/2003 | Ellis | H04N 5/44543 |
| | | | 725/87 |
| 2005/0028194 A1* | 2/2005 | Elenbaas | G06F 17/30787 |
| | | | 725/32 |
| 2005/0251827 A1 | 7/2005 | Ellis et al. | |
| 2005/0172312 A1* | 8/2005 | Lienhart | G06F 17/30802 |
| | | | 725/19 |
| 2006/0187358 A1* | 8/2006 | Lienhart | G06F 17/30802 |
| | | | 348/661 |
| 2007/0154163 A1* | 7/2007 | Cordray | H04N 21/6187 |
| | | | 386/278 |
| 2007/0283409 A1* | 12/2007 | Golden | H04H 60/33 |
| | | | 725/139 |
| 2008/0086755 A1* | 4/2008 | Darnell | H04N 5/44543 |
| | | | 725/105 |
| 2009/0248700 A1* | 10/2009 | Amano | G06F 17/30616 |
| 2010/0107194 A1* | 4/2010 | McKissick | H04N 5/44513 |
| | | | 725/40 |
| 2010/0153885 A1* | 6/2010 | Yates | G06F 3/0482 |
| | | | 715/841 |
| 2010/0265390 A1* | 10/2010 | Zhang | G06F 17/30781 |
| | | | 348/441 |
| 2011/0078112 A1* | 3/2011 | Takata | G06F 17/30156 |
| | | | 707/622 |
| 2011/0116719 A1* | 5/2011 | Bilobrov | G06K 9/00711 |
| | | | 382/217 |
| 2013/0031582 A1* | 1/2013 | Tinsman | H04N 21/2353 |
| | | | 725/36 |
| 2013/0111514 A1* | 5/2013 | Slavin | H04H 60/64 |
| | | | 725/18 |
| 2013/0160038 A1* | 6/2013 | Slaney | H04N 21/233 |
| | | | 725/14 |
| 2013/0204889 A1* | 8/2013 | Sinha | G06T 1/0021 |
| | | | 707/758 |
| 2013/0208942 A1* | 8/2013 | Davis | G06F 21/10 |
| | | | 382/100 |
| 2013/0276033 A1* | 10/2013 | Francini | H04N 5/44543 |
| | | | 725/50 |
| 2014/0064711 A1* | 3/2014 | Ziskind | H04N 5/76 |
| | | | 386/353 |
| 2014/0196070 A1* | 7/2014 | Moskowitz | H04N 21/4722 |
| | | | 725/19 |
| 2014/0282681 A1* | 9/2014 | Carney | H04N 21/4331 |
| | | | 725/28 |
| 2014/0325555 A1* | 10/2014 | Khader | H04N 21/2668 |
| | | | 725/32 |
| 2015/0373428 A1* | 12/2015 | Trollope | H04N 21/8133 |
| | | | 704/235 |
| 2016/0156972 A1* | 6/2016 | Oztaskent | H04N 21/44222 |
| | | | 725/14 |
| 2017/0094343 A1* | 3/2017 | Greene | H04N 21/4334 |

* cited by examiner

600

```
600 ...
601 Initialization Subroutine
602 ...
603 //Routine to determine whether a media asset being transmitted from a content source
      matches a media asset in a database by comparing respective fingerprints associated with
      each media asset:
604
605  Receive media fingerprints stored in a database
606  For each fingerprint in the database:
607    A = next fingerprint from the database
608    B = fingerprint generated based on a media asset to be validated
609        If (A=B)
610             Execute Subroutine to assign a media identifier associated with the media
      fingerprint from the database to the media asset being transmitted from the content source
      using processing circuitry
611             Termination Subroutine
612    Execute Subroutine to indicate that the media asset associated with the generated
      fingerprint is a new media asset using the processing circuitry
613 ...
614 Termination Subroutine
615 ...
```

FIG. 6

800 ...
801 Initialization Subroutine
802 ...
803 //Routine to search a database for a media fingerprint that matches a media fingerprint generated based on a media asset transmitted at a first time from a content source:
804
805   Receive the media fingerprint generated based on a media asset transmitted at a first scheduled time from a content source
806   Assign variable A to the media fingerprint generated based on the media asset transmitted at the first scheduled time from the content source
807     Query database containing media fingerprints and corresponding media asset identifiers for an entry matching variable A
808       If (Number of matching entries > 0)
809         Retrieve from database entries matching the media asset identifier corresponding to the matched fingerprint
810         Execute Subroutine to identify the media asset corresponding to the matched fingerprint using processing circuitry
811         Termination Subroutine
812 ...
813   Execute Subroutine to mark the media fingerprint as associated with a new media asset using processing circuitry
814 ...
815 Termination Subroutine
816 ...

FIG. 8

METHOD AND SYSTEM FOR VERIFYING SCHEDULED MEDIA ASSETS

BACKGROUND

Service providers and other entities may be interested in receiving validation that scheduled media assets are in fact the ones that are being transmitted. This is an extremely difficult task to perform manually because it requires periodically reviewing scheduled content from every available content source, comparing the information for each media asset to scheduled data, and recording the results.

SUMMARY

Accordingly, systems and methods are described herein for validating that content scheduled to be transmitted from a content source is in fact the content that is transmitted. For example, an episode of "Seinfeld" may be scheduled for transmission on channel five from 10 PM to 10:30 PM. In order to validate that the scheduled episode of "Seinfeld" is transmitted, the system may take a media fingerprint of the content that is transmitted between 10 PM and 10:30 PM on channel five. The system may then compare the media fingerprint with media fingerprints in a database of known media assets. When a match is found, the system may retrieve a unique identifier associated with the matched media fingerprint. The system may further determine a unique identifier associated with the episode of "Seinfeld" that is scheduled to be transmitted from channel five between 10 PM and 10:30 PM. The system may then compare the two identifiers and if the unique identifiers match, the media asset is validated. If the unique identifiers do not match, a discrepancy is found and various actions may be taken in response. As a result, validation of a scheduled media asset can occur automatically without a person having to perform this manually intensive task. Also, this task is now performed much more quickly. Additionally, use of media fingerprints cuts down on error rates.

In some aspects, control circuitry may be used to perform the actions required to validate a scheduled media asset. The control circuitry may generate, at a first time, a first media fingerprint based on a first media asset and a second media fingerprint based on a second media asset. The first media asset may have a first media identifier and the second media asset may have a second media identifier. For example, various systems may be configured to monitor content being transmitted to viewers from various content sources and generate media fingerprints at a specific time interval (e.g., one minute) based on the media assets being transmitted by the respective content sources. For example, a device (e.g., a server) may be configured with a plurality of tuners such that each tuner is tuned to a corresponding channel. The server may then generate a media fingerprint for every channel at an interval (e.g., once per minute). The media fingerprints may then be stored in a database together with an indication of a content source they were generated based on, and a media identifier of the media asset corresponding to the media fingerprint.

The control circuitry may also generate, at a second time, a third media fingerprint based on a third media asset that is received at a first scheduled time from a content source. For example, the control circuitry may receive an instruction to validate a media asset transmitted on channel five between 5 PM and 5:30 PM. In response, the control circuitry may generate a media fingerprint at a time between 5 PM and 5:30 PM based on media content transmitted from the content source. It should be noted that this media fingerprint may be generated on a user equipment device. It should also be noted that the process of validating a scheduled media asset may be performed on a user equipment device (e.g., a set-top box).

The control circuitry may then compare the third media fingerprint to the first media fingerprint to determine whether the third media asset matches the first media asset. For example, the control circuitry may compare each media fingerprint in the database described above to the media fingerprint generated for content transmitted from channel five between 5 PM and 5:30 PM. In some embodiments, control circuitry may generate multiple media fingerprints to validate a media asset. For example, if one media fingerprint is generated during a commercial, the commercial will not match the scheduled media asset. However, if the control circuitry generates multiple media fingerprints at specific intervals and then compares them to determine a media fingerprint that is based on the true media asset (not a commercial), a proper match may be found later in the process.

The control circuitry may determine that the third media asset matches the first media asset based on the comparison of the third media fingerprint and the first media fingerprint. In continuing with the example above, when the control circuitry finds a matching media fingerprint for the content transmitted from channel five between 5 PM and 5:30 PM, the control circuitry may identify the media content as episode three of season two of "Seinfeld."

Furthermore, the control circuitry may, in response to determining that the third media asset matches the first media asset, assign the first media identifier to the third media asset. For example, episode three of season two of "Seinfeld" may correspond to a specific media identifier (e.g., a unique alphanumeric identifier) that is stored in the database. The control circuitry may assign the specific media identifier to the media content that is transmitted from channel five between 5 PM and 5:30 PM. The control circuitry may continue to compare media fingerprints in the database to the generated media fingerprint until a match is found.

In some embodiments, the control circuitry may generate multiple media fingerprints in order to avoid executing a media fingerprint comparison of a media fingerprint corresponding to, for example, a news break. In those embodiments, the control circuitry may be comparing multiple media fingerprints with media fingerprints in the database.

In some embodiments, the generated media fingerprint may not be matched to any media fingerprint in the database. In those instances, the system may mark the media fingerprint as belonging to an unknown media asset. The generated media fingerprint may be added to the database as a media fingerprint generated based on a new media asset. The control circuitry may then instruct the database to create a new record for the new media fingerprint. The new media fingerprint may be identified at a later point. For example, a report may be periodically generated (e.g., daily) by the database indicating all new media fingerprints added to the database as well as their transmission times and corresponding content source. Another mechanism may be used for identifying those media assets and assigning new media identifiers to them. For example, this mechanism may be the same mechanism as described below in relation to populating the database with records for the first media asset and the second media asset, for example by comparing to scheduling data.

The control circuitry may also compare the first media identifier to a media identifier that is associated with a media asset scheduled to be transmitted at the first scheduled time from the content source. For example, the control circuitry may compare the media identifier corresponding to episode three of season two of "Seinfeld" (e.g., the unique alphanumeric identifier) with the media identifier corresponding to the media asset scheduled for transmission on channel five between 5 PM and 5:30 PM.

Furthermore, the control circuitry may, in response to determining that the first media identifier matches the media identifier that is associated with the media asset scheduled to be transmitted at the first scheduled time from the content source, validate the third media asset as a correct transmission. For example, if the two media identifiers both match episode three of season two of "Seinfeld," the system has validated the scheduled media asset. In those instances when the media identifiers are alphanumeric strings, the control circuitry may perform a direct comparison of the two alphanumeric strings.

In some embodiments, the control circuitry may populate the database described above with a first record for the first media asset. The first record may include a first field for the first media fingerprint and a second field for the first scheduled media identifier. For example, as described above, the control circuitry may be generating media fingerprints based on media assets for multiple channels. The control circuitry may be part of a server that is configured with multiple tuners that enable that server to receive media assets from various content sources. The server may be generating media fingerprints based on the media assets received from those tuners. For example, the server may be configured with five tuners that are receiving broadcasts from five different channels. The control circuitry on the server may be periodically (e.g., every 30 seconds, every minute, every 5 minutes) generating media fingerprints for all five channels. The control circuitry may then identify the media assets that are being transmitted and transmit media asset identifiers and corresponding media fingerprints to the database described above. The database may determine whether the media fingerprints and the media identifiers should be saved as new records including fields for a media identifier and the media fingerprint or media fingerprints added to previously generated records corresponding to appropriate media identifiers.

In some embodiments, the control circuitry may, when comparing the third media fingerprint to the first media fingerprint to determine whether the third media asset matches the first media asset, take the following actions. The control circuitry may identify the first record in the database based on a value in the second field. The control circuitry may then retrieve the first record from the database and extract the first media fingerprint from the first field. For example, the control circuitry may iterate through each record in the database until the comparison is successful or all the records have been processed.

In some embodiments, the control circuitry may when, generating the third media fingerprint for the third media asset, generate an alphanumeric character that uniquely identifies media content having a common characteristic. For example, if the control circuitry is unable to identify a media asset that corresponds to the third media fingerprint, the control circuitry may determine that this media asset is unknown and must be added to the database as a new entry. The control circuitry may then generate a new media identifier for this media asset to be stored in the database. The media identifier may be an alphanumeric string of characters that uniquely identifies the media asset corresponding to the media fingerprint for which the media asset could not be matched.

In some embodiments, the common characteristic includes a series episode number and a title, or a serial number. For example, a media asset may be identified by a series episode number and a title of the series. Thus, the combination of these two attributes identifies a unique media asset.

In some embodiments, the control circuitry, when generating the third media fingerprint for the third media asset, generates an alphanumeric character that uniquely identifies media content based on an object appearing in the third media asset. For example, a specific object that appears at a certain point in the media asset may uniquely identify that media asset. In those instances, the control circuitry may create a unique alphanumeric string for that media asset.

In some embodiments, the control circuitry, when generating the third media fingerprint for the third media asset, generates an alphanumeric character that uniquely identifies media content having common metadata. For example, a media asset may be identified by its metadata (e.g., title, year of release, and an episode in a series for media assets that are part of a series). In those instances, the control circuitry may assign a unique alphanumeric string to media assets where enough metadata matches.

In some embodiments, the control circuitry may transmit a validation of the third media asset to a remote source. For example, if the control circuitry determines that the media asset has been validated, the control circuitry may transmit a successful validation to the system's owner, an advertiser, a broadcaster, or another entity. If validation fails, the control circuitry may take various actions that may be configured by a system's owner or another party such as an advertiser or a broadcaster. Some of the actions that may be taken include sending a Short Message Service ("SMS") message, sending an email, sending an update to a scheduling database that includes scheduling data, etc.

BRIEF DESCRIPTION OF THE DRAWINGS

FIG. 6 depicts illustrative pseudo-code involved in determining whether a media asset being transmitted from a content source matches a media asset in a database based on comparing respective media fingerprints associated with each media asset, in accordance with some embodiments of this disclosure;

FIG. 8 is pseudo-code involved in searching a database for a media fingerprint that matches a media fingerprint generated based on a media asset transmitted at a first time from a content source, in accordance with some embodiments of this disclosure;

DESCRIPTION

Figure 1:
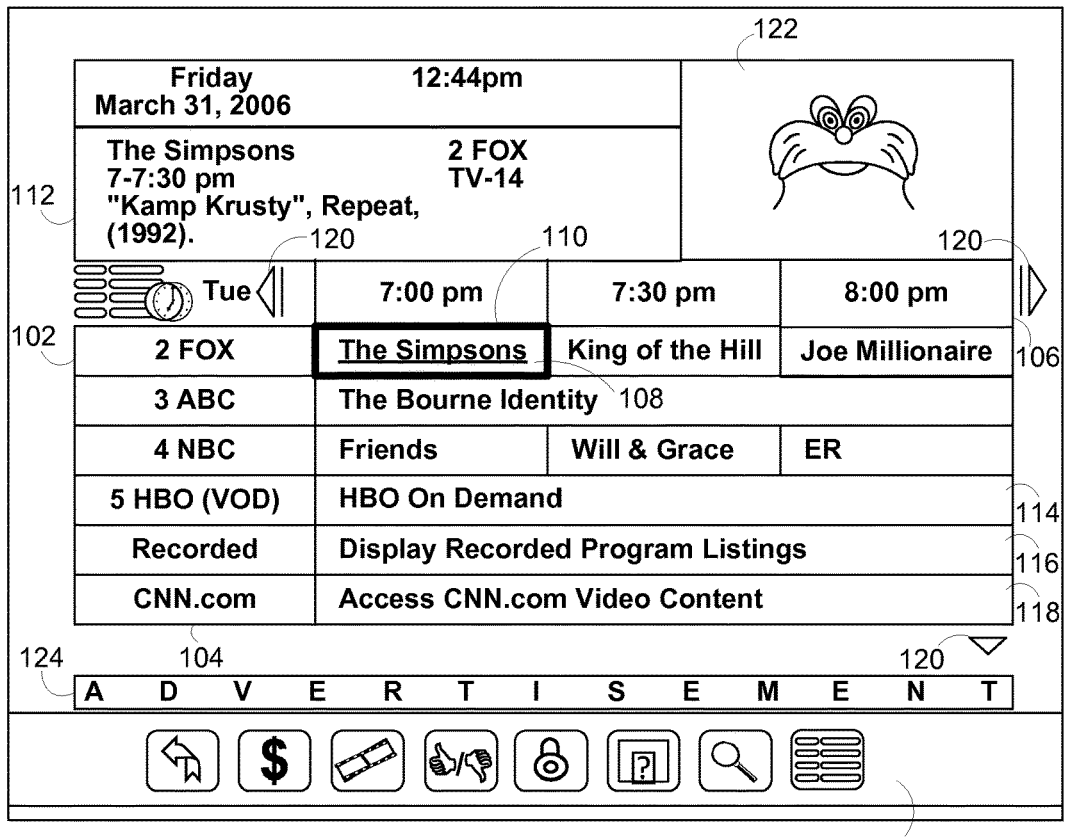
FIG. 1 shows an illustrative embodiment of a display screen that may be used to provide media guidance application listings and other media guidance information, in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
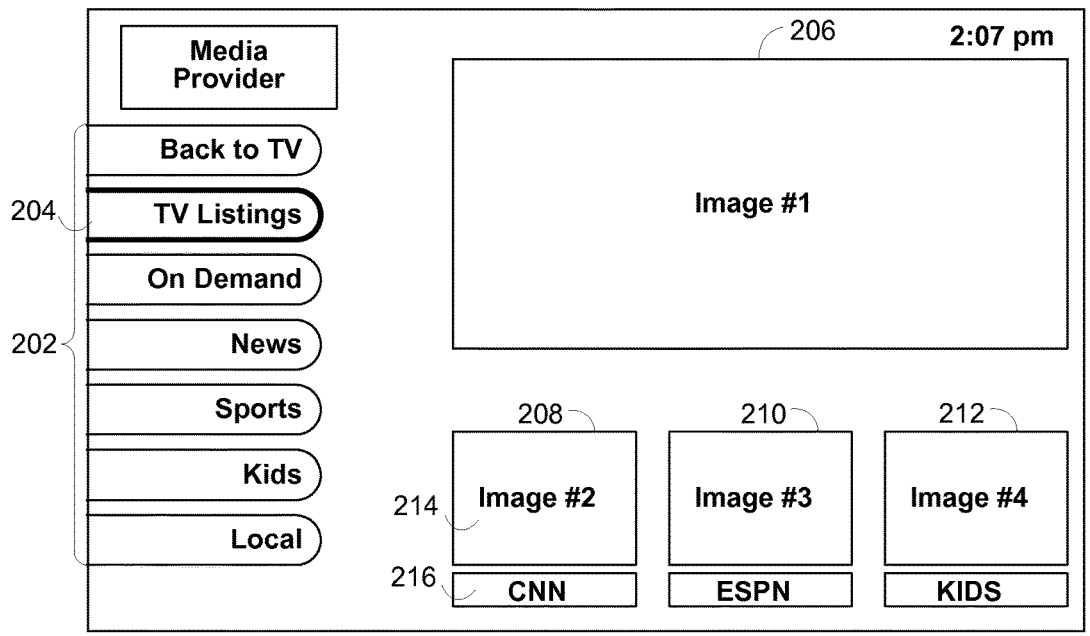
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/ or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
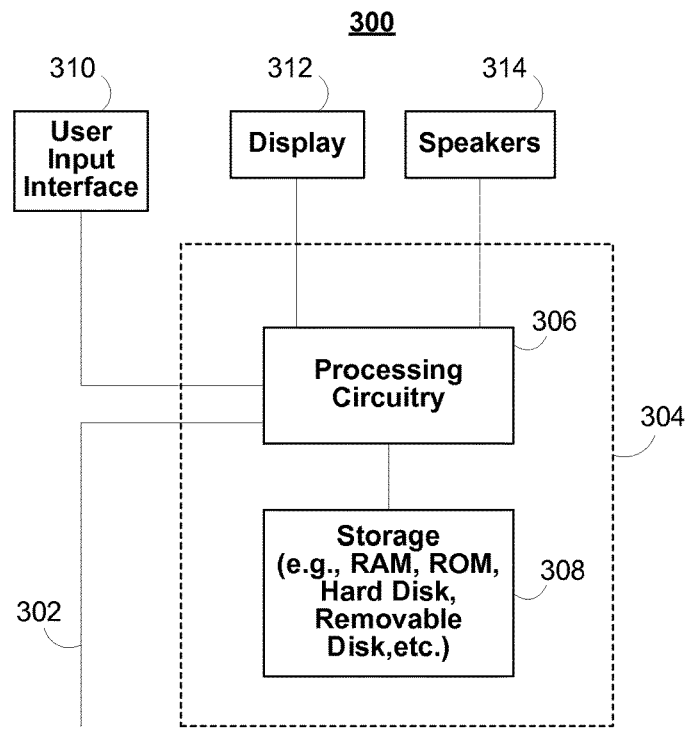
FIG. 3 is a block diagram of an illustrative device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
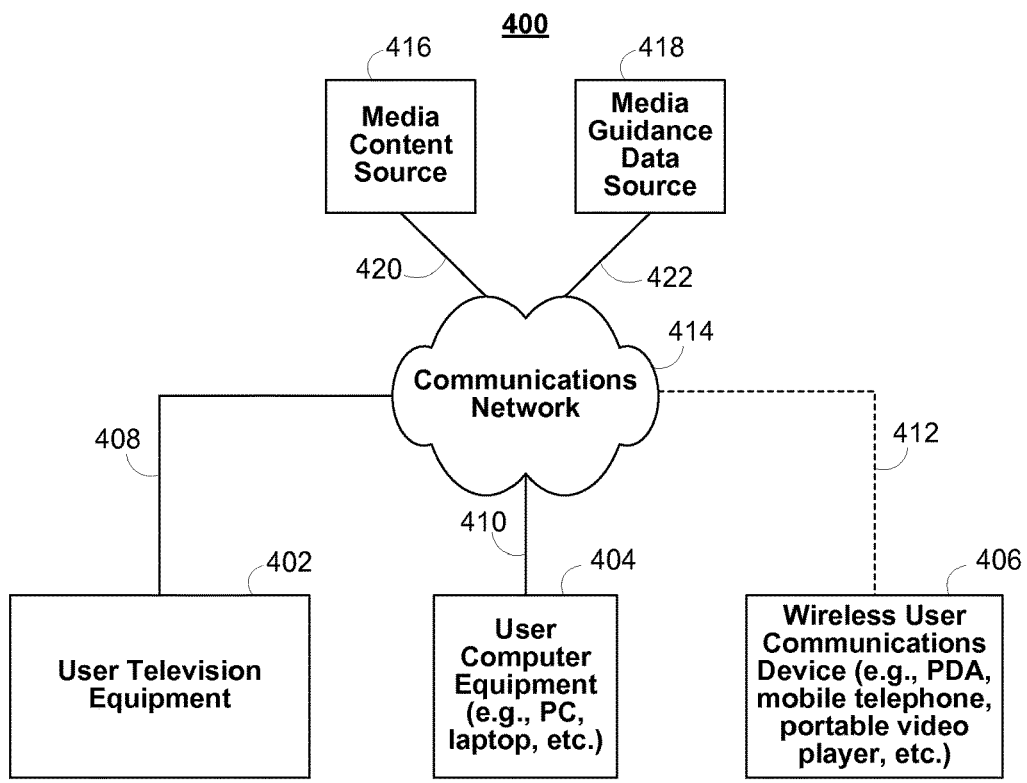
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Control circuitry 304 may generate, at a first time, a first media fingerprint based on a first media asset and a second media fingerprint based on a second media asset, wherein the first media asset has a first media identifier and the second media asset has a second media identifier. For example, control circuitry 304 may reside on a device that includes a tuner to tune to a broadcast channel. As referred to herein, the term "media identifier" refers to any combination of characters, pictographs or other designators that enables a media asset to be uniquely identified. For example, a unique alphanumeric string may be assigned as a media identifier. As referred to herein the term "media fingerprint" refers to a digital set of data derived from a media asset and/or metadata associated with the media asset that uniquely identifies that media asset. In some instances, the term "fingerprint" may be used to refer to a "media fingerprint." The device may be a server associated with media content source 416 or media guidance data source 418. It should be noted that the device may have multiple tuners to tune in to multiple broadcast channels. Additionally or alternatively, the device may include tuners that are able to tune in to network broadcasts and multicasts (e.g., Internet broadcasts, Internet multicasts, etc.). It should be noted that the same processes may be performed on a user equipment device (e.g., a set-top box).

Control circuitry 304 may periodically generate media fingerprints based on media content being received by those tuners. Control circuitry 304 may be storing the generated fingerprints in storage 308. Control circuitry 304 may then identify the media assets that the generated fingerprints correspond to. For example, control circuitry 304 may query a database of fingerprints and corresponding media asset identifiers in order to identify the media asset that corresponds to the media fingerprint. The database may reside at media content source 416 or media guidance data source 418. In some embodiments, the database of media fingerprints may be stored on a user equipment device (e.g., user equipment device 402, 404, or 406). If the media fingerprint is not matched to a media fingerprint in the database, control circuitry 304 may determine the name and other information about the media asset from scheduling information. Additionally or alternatively, the media asset may be identified manually by a person. Someone may then enter information about the media asset into a device that contains control circuitry 304. Control circuitry 304 may then generate a media identifier for the media asset and link the entered information to the media identifier. Additionally or alternatively, control circuitry 304 may generate a media identifier based on the entered information or the scheduling information, if the scheduling information was used to identify the media asset corresponding to the generated fingerprint.

In some embodiments, control circuitry 304 may generate, at a second time, a third media fingerprint based on a third media asset that is received at a first scheduled time from a content source. For example, control circuitry 304 may receive an instruction to validate a media asset being transmitted from a content source at a specific time (e.g., a show being broadcast on channel 5 between 5 PM and 5:30 PM). In response, control circuitry 304 may generate a fingerprint based on the media content that is being transmitted from the content source at the specific time. Control circuitry 304 may then store the fingerprint in storage 308.

In some embodiments, control circuitry 304 may reside on a user equipment device (e.g., user television equipment 402, user computer equipment 404, or wireless user communications device 406). The user equipment device of these embodiments may also have multiple tuners and may generate a media fingerprint in order to validate a scheduled media asset as the media asset that is being transmitted from a specific content source at a specific scheduled time.

In some embodiments, control circuitry 304 may compare the third media fingerprint to the first media fingerprint to determine whether the third media asset matches the first media asset. For example, control circuitry 304 may have stored the media fingerprint that is generated in order to validate the media asset that is being transmitted from a specific content source in storage 308. Control circuitry 304 may retrieve the generated fingerprint from storage 308. Control circuitry 304 may also query a database in order to retrieve a fingerprint from the database that is to be compared with the fingerprint generated based on the media asset. Control circuitry 304 may query a database located at media content source 416 or media guidance data source 418. In some embodiments, control circuitry 304 may perform the comparison of the two media fingerprints by extracting data from the fingerprints that uniquely identifies a media asset and then comparing the extracted data. For example, average luminance of appropriate frames may be stored as part of the fingerprint and then compared to match the two fingerprints.

In some embodiments, control circuitry 304 may determine that the third media asset matches the first media asset based on the comparison of the third media fingerprint and the first media fingerprint. For example, if average luminance of appropriate frames is compared, control circuitry 304 may determine a match if the average luminance values are similar enough to each other.

In some embodiments, control circuitry 304 may in response to determining that the third media fingerprint does not match the first media fingerprint, compare the third media fingerprint to the second media fingerprint to determine whether the third media asset matches the second media asset. For example, control circuitry 304 may keep retrieving fingerprints from the database and comparing them to the generated fingerprint until a match is found. In some embodiments, control circuitry 304 may retrieve several fingerprints from the database in order to make the comparison operation more efficient. Control circuitry 304 may query the database for all the fingerprints in order to run the comparison, but the database server may be returning a subset of results in each request until all the results have been returned.

In some embodiments, control circuitry 304 may, in response to determining that the third media fingerprint does not match the second media fingerprint, designate the third media asset as a new media asset. For example, if control circuitry 304 compares all the fingerprints in the database with the generated fingerprint and does not find a match, control circuitry 304 may determine that the media fingerprint corresponds to a media asset that has not been fingerprinted yet. This may be a media fingerprint based on an episode of a show that has not been transmitted in the past.

In some embodiments, control circuitry 304 may, in response to determining that the third media asset matches the first media asset, assign the first media identifier to the third media asset. For example, if control circuitry 304 determines that the generated fingerprint matches a fingerprint in the database and that fingerprint matches episode three of season two of "Seinfeld," control circuitry 304 may retrieve, from the database, a media identifier (e.g., a unique alphanumeric string of characters) corresponding to episode three of season two of "Seinfeld" from the database and store it in storage 308. Control circuitry 304 may then assign the retrieved media identifier to the generated media fingerprint.

In some embodiments, control circuitry 304 may compare the first media identifier to a media identifier that is associated with a media asset scheduled to be transmitted at the first scheduled time from the content source. For example, control circuitry 304 may query a database that includes scheduling data in order to identify a media asset that is scheduled to be transmitted from the content source at the time when the third fingerprint was generated. Control circuitry 304 may then determine a media identifier corresponding to the scheduled media asset (e.g., an alphanumeric string). As referred to herein, the term "scheduling data" refers to media guidance data for various content sources. Scheduling data may reside in a scheduling database. Control circuitry may store the media identifier corresponding to the scheduled media asset in storage 308.

Control circuitry 308 may then compare the two media identifiers. Control circuitry may do a straight string comparison in order to determine whether the media identifiers match.

In some embodiments, control circuitry 304 may, in response to determining that the first media identifier matches the media identifier that is associated with the media asset scheduled to be transmitted at the first scheduled time from the content source, validate the third media asset as a correct transmission. For example, if the media identifiers described above match, control circuitry 304 may mark the scheduled media asset as validated. Control circuitry 304 may mark the scheduled media asset validated by updating a log file, updating an entry in a database (e.g., the database described above), etc.

Figure 9:
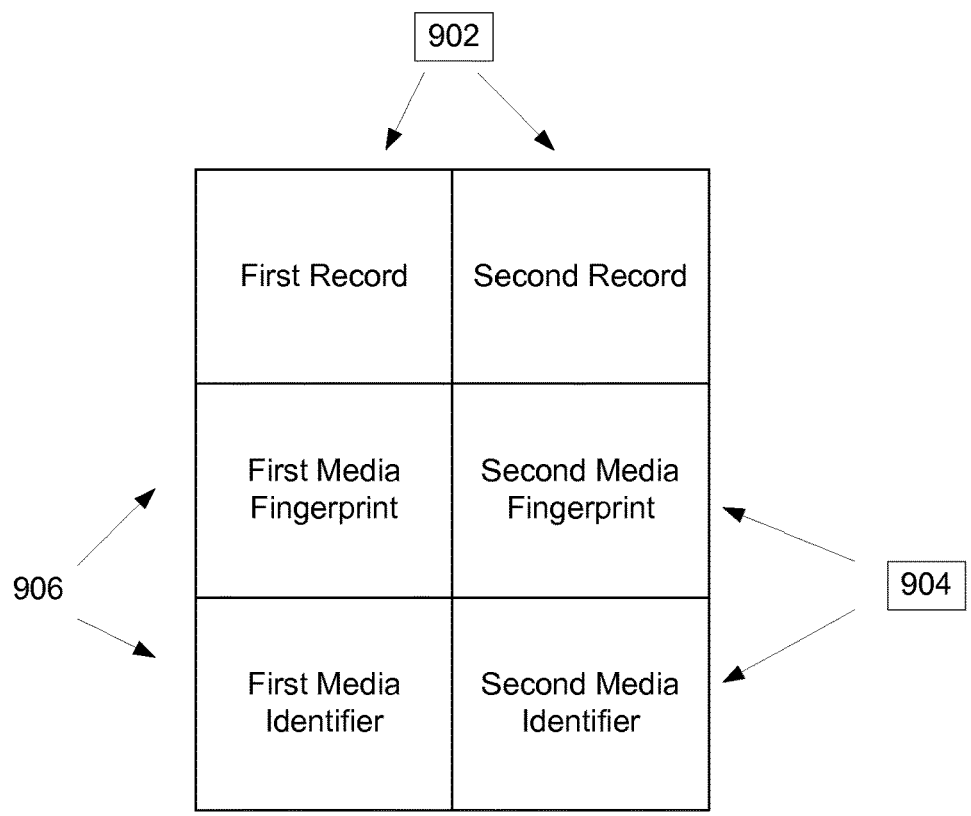
FIG. 9 depicts one possible way to store media fingerprints and corresponding media identifiers, respectively, in accordance with some embodiments of this disclosure.

In some embodiments, control circuitry 304 may populate a database with a first record for the first media asset, where the first record includes a first field for the first media fingerprint and a second field for the first media identifier. The first and the second records may be placed in a database table. FIG. 9 illustrates one possible arrangement for the database table. Columns 902 may represent two records in the database table. It should be noted that in many implementations there would be many more columns than illustrated in FIG. 9. Items 906 may represent the entries in the first record. The entries might represent the first media fingerprint and the first media identifier. In some implementations, entries 906 may be links to another table where the actual first media fingerprint and first media identifier may be stored. Items 904 represent entries for the second record. Items 904 may be implemented in the same manner as items 906.

In some embodiments, control circuitry 304, when comparing the third media fingerprint to the first media fingerprint to determine whether the third media asset matches the first media asset, performs the following actions. Control circuitry 304 may identify the first record in the database based on a value in the second field. Control circuitry 304 may be iterating through all the records in the database by retrieving records based on media identifiers. Thus, control circuitry 304 may retrieve the first record from the database. Control circuitry 304 may extract the first media fingerprint from the first field. For example, control circuitry 304 may retrieve a full first record from the database. Control circuitry 304 may store the retrieved record in a data structure in storage 308. That data structure may be an array or any other data structure appropriate to store this type of data. Control circuitry 304 may then access the data structure in storage 308 and extract the first media fingerprint from the first field, as it is stored in the data structure. Once a specific media identifier has been iterated through, control circuitry 304 may mark that media identifier as processed and move on to the next media identifier.

In some embodiments, control circuitry 304 may, when generating the third media fingerprint for the third media asset, generate an alphanumeric character that uniquely identifies media content having a common characteristic. For example, control circuitry 304 may generate media identifiers in a predetermined order as new media assets are discovered. For example, control circuitry 304 may start assigning numbers as media asset identifiers to media assets.

In some embodiments, the common characteristic may include a series episode number and a title, or a serial number. Because a series and an episode number are enough to identify a specific media asset, those two attributes of the media asset may be combined to form the common characteristic. Additionally or alternatively, a serial number is enough to identify a media asset; thus, a serial number may be used as a common characteristic.

In some embodiments, control circuitry 304 may, when generating the third media fingerprint for the third media asset, generate an alphanumeric character that uniquely identifies media content based on an object appearing in the third media asset. For example, if a specific object is unique to a media asset, control circuitry 304 may generate a unique identifier for that media asset and assign the unique media identifier to all content that matches the object. If control circuitry 304 identifies the same object in media content, control circuitry may determine that the media content is the media asset corresponding to the object.

In some embodiments, control circuitry 304 may, when generating the third media fingerprint for the third media asset, generate an alphanumeric character that uniquely identifies media content having common metadata. For example, control circuitry 304 may determine that a media asset being fingerprinted shares common metadata (e.g., a title, release date, and episode number) with another media asset in a database described above. Thus, control circuitry 304 may assign the same alphanumeric character as a media identifier for those two media assets.

In some embodiments, control circuitry 304 may transmit a validation of the third media asset to a remote source. For example, control circuitry 304 may reside on a device that is connected to a network (e.g., the Internet). Control circuitry 304 may then send validation information (whether successful validation or unsuccessful) to a remote source (e.g., remote server or another device). A user may configure different actions in response to an unsuccessful validation. Those actions may include sending an SMS, sending an email, writing an entry in a log file or updating a scheduling database with accurate information. Control circuitry 304 may be connected to a network (e.g., communications network 414) that may be used to transmit the appropriate information to an appropriate source, for example, an advertiser that requires validation information as to whether the advertiser's commercial was displayed while the desired media asset was displayed. This may be useful when an advertiser desires that its product be advertised during a specific show, for example, advertising hockey equipment during a hockey game.

In some embodiments, ratings providers may require validation information. For example, a ratings provider may be monitoring a specific channel at a specific time to determine a number of people that watched a specific movie. The ratings information may be inaccurate if a different media asset is transmitted instead of the movie. Thus, control circuitry 304 may transmit the validation information to a ratings provider.

Figure 5:
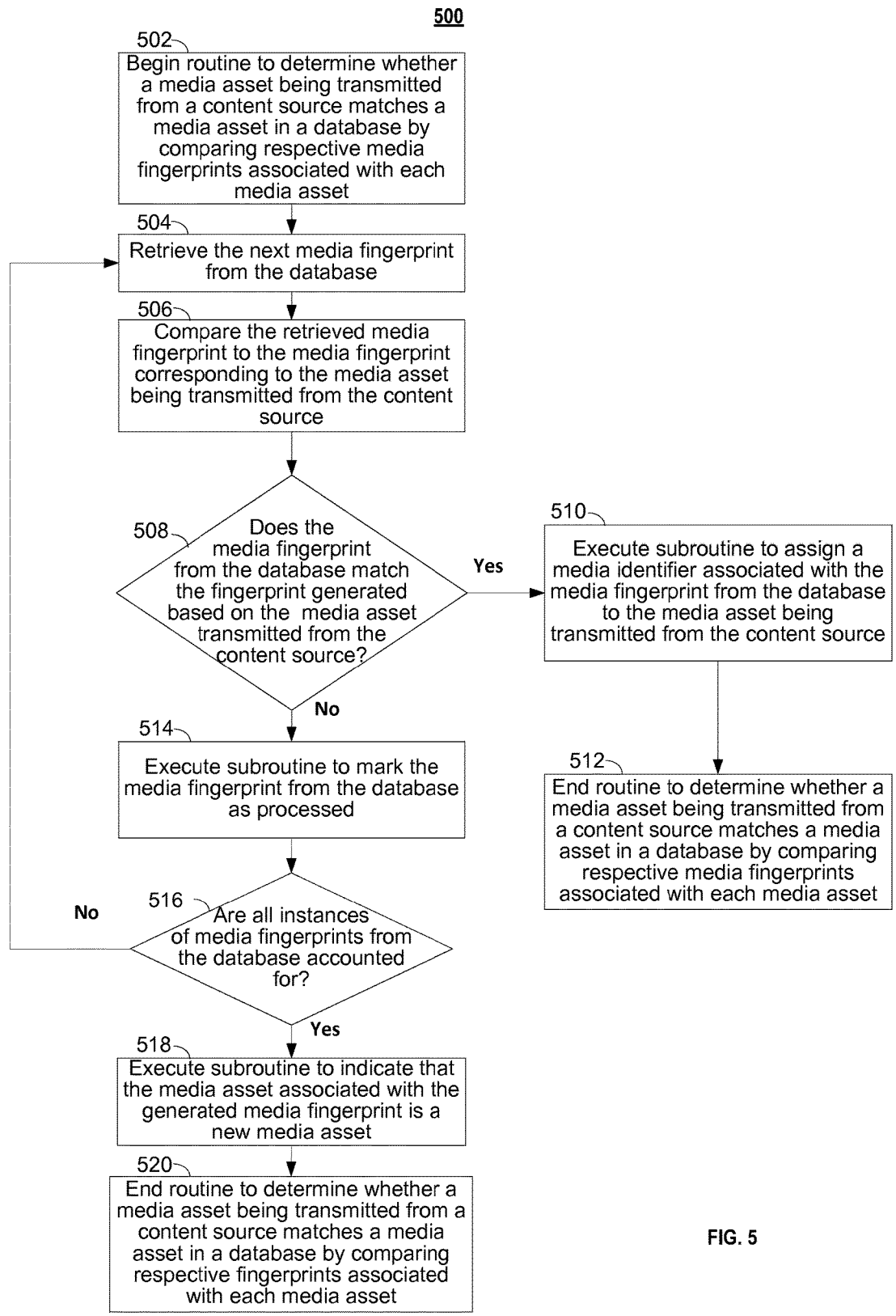
FIG. 5 depicts an illustrative process involved in determining whether a media asset being transmitted from a content source matches a media asset in a database based on comparing respective media fingerprints associated with each media asset, in accordance with some embodiments of this disclosure.

FIG. 5 depicts a flowchart that depicts an illustrative process to determine whether a media asset being transmitted from a content source matches a media asset in a database by comparing respective fingerprints associated with each media asset, in accordance with some embodiments of the disclosure. In some embodiments, programming instructions based on the flowchart may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes a process for control circuitry (e.g., control circuitry 304) to determine whether a media asset being transmitted from a content source matches a media asset in a database by comparing respective fingerprints associated with each media asset in accordance with some embodiments of the disclosure.

At step 502, control circuitry 304 begins a routine to determine whether a media asset being transmitted from a content source matches a media asset in a database by comparing respective fingerprints associated with each media asset. This routine may begin based on a request to validate a scheduled media asset. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm his/her input using a display (e.g., by generating a prompt to be displayed on display 312) prior to running the process.

At step 504, control circuitry 304 proceeds to retrieve the next media fingerprint from a database. In some embodiments, control circuitry 304 may receive a single primitive data structure that represents the media fingerprint. In some embodiments, the media fingerprint may be stored as part of a larger data structure, and control circuitry 304 may retrieve the media fingerprint by executing appropriate accessor methods to retrieve the media fingerprint from the larger data structure.

At step 506, control circuitry 304 proceeds to compare the first media fingerprint retrieved from the database to the media fingerprint generated based on the media asset to be validated. In some embodiments, the media fingerprint based on the media asset to be validated may be stored (e.g., in storage device 308) prior to beginning the process. In some embodiments, the media fingerprint based on the media asset to be validated may also be retrieved for each and every instance of a media fingerprint in the database. In some embodiments, control circuitry 304 may directly compare the two fingerprints by accessing the media fingerprints respectively from memory and performing a comparison of the data inside the fingerprints. In some instances, control circuitry 304 may call a comparison function (e.g., for object to object comparison).

At step 508, control circuitry 304 compares the two fingerprints to determine if they match. If the condition is satisfied, the process proceeds to step 510; if the condition is not satisfied, the process proceeds to step 512 instead.

At step 510, control circuitry 304 executes a subroutine to assign a media identifier associated with the media fingerprint from the database to the media asset being transmitted from the content source based on the condition at step 508 being satisfied.

At step 512, control circuitry 304 ends the routine to determine whether a media asset being transmitted from a content source matches a media asset in a database by comparing respective fingerprints associated with each media asset.

At step 514, control circuitry 304 executes a subroutine to mark the media fingerprint from the database as processed based on the condition of step 508 being satisfied. After the subroutine is executed, the process proceeds to step 516 where it is determined if all the media fingerprints in the database are accounted for (e.g., processed).

At step 516, control circuitry 304 executes a subroutine to determine whether all instances of media fingerprints from the database were accounted for. After the subroutine is executed, the process may proceed to 518 where control circuitry 304 executes a subroutine to indicate that the media asset associated with the generated fingerprint is a new media asset.

At step 520, control circuitry 304 executes a subroutine to end the routine to determine whether a media asset being transmitted from a content source matches a media asset in a database by comparing respective fingerprints associated with each media asset.

It is contemplated that the descriptions of FIG. 5 may be used with any other embodiment of this disclosure. In addition, the descriptions described in relation to the process of FIG. 5 may be done in alternative orders or in parallel to further the purposes of this disclosure. For example, conditional statements and logical evaluations, such as those at 508 and 516, may be performed in any order or in parallel or simultaneously to reduce lag or increase the speed of the system or method. As a further example, in some embodiments, several media fingerprints may be compared in parallel, using multiple logical processor threads, or the process may be enhanced by incorporating branch prediction. Furthermore, it should be noted that the process of FIG. 5 may be implemented on a combination of appropriately configured software and hardware, and that any of the devices or equipment discussed in relation to FIGS. 3-4 could be used to implement one or more portions of the process.

FIG. 6 is an illustrative example of pseudo-code that may represent instructions to implement process 500 of FIG. 5. The pseudo-code in FIG. 6 illustrates the process to determine whether a media asset being transmitted from a content source matches a media asset in a database by comparing respective media fingerprints associated with each media asset in accordance with some embodiments of the disclosure. It will be evident to one skilled in the art that the pseudo-code in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, control circuitry 304 executes a subroutine to initialize variables and prepare to determine whether a media asset being transmitted from a content source matches a media asset in a database by comparing respective fingerprints associated with each media asset, which begins on line 605. For example, in some embodiments, control circuitry 304 may copy instructions from a non-transitory storage medium (e.g., storage device 308) into RAM or into the cache for processing circuitry 306 during the initialization stage. Additionally, in some embodiments, the media fingerprints being used for comparison, or a tolerance level for determining if two media fingerprints match, may be retrieved, set, and stored at 601.

At line 605, control circuitry 304 receives fingerprints stored in a database. In some embodiments, these media fingerprints may be stored in storage 308 and when needed retrieved from storage 308. Control circuitry 304 may receive the media fingerprints by receiving, for example, a pointer to an array of media fingerprints. In another example, control circuitry 304 may receive an object of a class, such as an iterator object containing elements of the media fingerprints.

At line 606, control circuitry 304 iterates through the media fingerprints; if only a single media fingerprint is available, the loop will only execute once. This loop may be implemented in multiple fashions depending on the choice of hardware and software language used to implement the pseudo-code of FIG. 6; for example, this may be implemented as part of a "for" or "while" loop.

At line 607, control circuitry 304 stores the next media fingerprint to be processed into a temporary variable "A." In some embodiments, the media fingerprint is stored as part of a larger data structure or class, and may be obtained through appropriate accessor methods. In some embodiments, control circuitry 304 may call a function to perform a comparison of two media fingerprints. In some embodiments, a media fingerprint from the database may be encoded as a primitive data structure, and rather than using a temporary variable, the media fingerprint may be directly used in the comparisons at line 609.

At line 608, control circuitry 304 stores the value of a media fingerprint generated based on a media asset to be validated into a temporary variable "B." Similar to media fingerprints from the database, in some embodiments, the media fingerprint generated based on the media asset to be validated is stored as part of a larger data structure or class, and the media fingerprint generated based on the media asset to be validated may be obtained through accessor methods. In some embodiments, the media fingerprint generated based on the media asset to be validated may be a primitive data structure, and may be directly used in the comparison at line 609.

At line 609, control circuitry 304 compares the media fingerprint of A to the media fingerprint of B to see if they match.

At line 610, control circuitry 304 executes a subroutine to assign a media identifier associated with the media fingerprint from the database to the media fingerprint generated by the media asset being transmitted from the content source using processing circuitry if the condition in line 609 is satisfied. In some embodiments, this may be achieved by processing circuitry 306 sending the appropriate signals to the processing circuitry.

At line 611, control circuitry 304 runs a termination subroutine after the pseudo-code has performed its function. For example, in some embodiments, control circuitry 304 destructs variables, performs garbage collection, frees memory or clears the cache of processing circuitry 306.

At line 612, control circuitry 304 executes a subroutine to indicate that the media asset associated with the generated fingerprint is a new media asset using processing circuitry 306.

At line 614, control circuitry 304 runs a termination subroutine after the pseudo-code has performed its function. For example, in some embodiments, control circuitry 304 destructs variables, performs garbage collection, frees memory or clears the cache of processing circuitry 306.

It will be evident to one skilled in the art that the process described by the pseudo-code in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments, break conditions may be placed after lines 610 and 612 to speed operation, or the conditional statements may be replaced with a case-switch. In some embodiments, rather than iterating over all instances of media fingerprints from the database at step 506, in some embodiments, the code may be rewritten so control circuitry 304 is instructed to evaluate multiple instances of media fingerprints from the database simultaneously on a plurality of processors or processor threads, lowering the number of iterations needed and potentially speeding up computation time.

Figure 7:
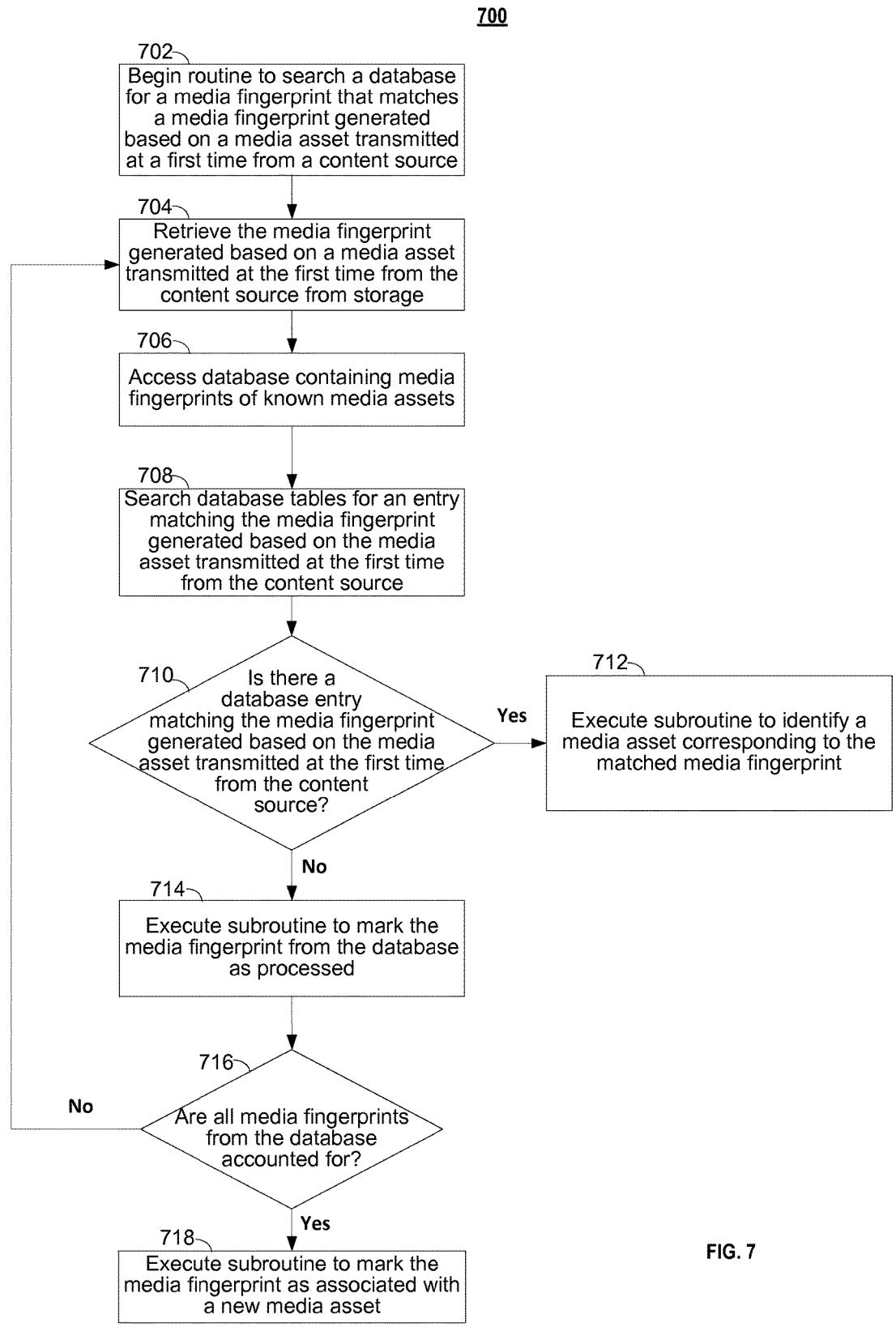
FIG. 7 depicts an illustrative process involved in searching a database for a media fingerprint that matches a media fingerprint generated based on a media asset transmitted at a first time from a content source, in accordance with some embodiments of this disclosure.

FIG. 7 depicts an illustrative process for control circuitry (e.g., control circuitry 304) to search a database for a media fingerprint that matches a media fingerprint generated based on a media asset transmitted at a first time from a content source using a database containing media fingerprints and corresponding media identifiers, in accordance with some embodiments of the disclosure. Similar to the process described by FIG. 5, in some embodiments, programming instructions for this process may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes a process for control circuitry (e.g., control circuitry 304) to search a database for a media fingerprint that matches a media fingerprint generated based on a media asset transmitted at a first time from a content source, in accordance with some embodiments of the disclosure.

At step 702, control circuitry 304 searches a database for a media fingerprint that matches a media fingerprint generated based on a media asset transmitted at a first time from when a content source is started. In some embodiments, this may be done either directly or indirectly in response to a user action or input (e.g., from signals received by control circuitry 304 or user input interface 310).

At step 704, control circuitry 304 proceeds to retrieve a media fingerprint based on a media asset to be validated from storage 308. In some embodiments, control circuitry 304 may retrieve a single primitive data structure that represents the media fingerprint based on a media asset to be validated. In some embodiments, control circuitry 304 may retrieve the value from a larger class or data structure.

At step 706, control circuitry 304 accesses a database containing media fingerprints of known media assets. In some embodiments, this database may be stored locally (e.g., on storage device 308) prior to beginning the process. In some embodiments, the database may also be accessed by using communications circuitry to transmit information across a communications network (e.g., communications network 414) to a database implemented on a remote storage device (e.g., media guidance data source 418).

At step 708, control circuitry 304 searches database tables for entries matching the media fingerprint based on a media asset to be validated. In some embodiments, control circuitry 304 may submit a general query to the database for a table entry matching a media fingerprint based on a media asset to be validated, and control circuitry 304 may receive an index or a data structure containing a portion of the database contents. In some embodiments, the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the process of FIG. 7 may be implemented using multiple independent or cross-referenced databases.

At step 710, control circuitry 304 may determine whether there is a database entry matching the media fingerprint based on a media asset to be validated. In some embodiments, control circuitry 304 may receive a signal from the database indicating that there are no matching entries. In some embodiments, control circuitry 304 may instead receive an index or a data structure with a NULL or dummy value. If control circuitry 304 identifies that there is a database entry matching the media fingerprint based on a media asset to be validated, the process proceeds to step 712; otherwise the process proceeds to step 714.

At step 712, control circuitry 304 executes a subroutine to identify a media asset corresponding to the matched fingerprint. For example, control circuitry 304 may retrieve a media identifier corresponding to the media fingerprint from the database that matches the generated fingerprint. Control circuitry 304 may then store the media identifier in storage 308.

At step 714, control circuitry 304 executes a subroutine to mark the fingerprint from the database as processed. Specifically, control circuitry 304 may store, in storage 308, a data structure that includes a media identifier of each fingerprint and the status of each fingerprint (e.g., zero corresponding to fingerprints that have not been processed and one corresponding to fingerprints that have been processed). Thus, control circuitry 304 may update the status associated with each fingerprint identifier from zero to one in order to mark the fingerprint as processed.

At step 716, control circuitry 304 determines whether all fingerprints from the database have been accounted for. If control circuitry 304 determines that all fingerprints from the database have been accounted for, process 700 proceeds to step 718; otherwise the process proceeds to step 704.

At step 718, control circuitry 304 executes a subroutine to mark the media fingerprint as associated with a new media asset.

It is contemplated that the descriptions of FIG. 7 may be used with any other embodiment of this disclosure. In addition, the descriptions described in relation to the process of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the process. Furthermore, it should be noted that the process of FIG. 7 may be implemented on a combination of appropriately configured software and hardware, and that any of the devices or equipment discussed in relation to FIGS. 3-4 could be used to implement one or more portions of the process.

The pseudo-code in FIG. 8 describes a process to search a database for a media fingerprint that matches a media fingerprint generated based on a media asset transmitted at a first time from a content source, in accordance with some embodiments of the disclosure. It will be evident to one skilled in the art that the process described by the pseudo-code in FIG. 8 may be implemented in any number of programming languages and on a variety of different hardware, and that the style and format should not be construed as limiting, but rather as a general template of the steps and procedures that would be consistent with code used to implement some embodiments of this disclosure.

At line 801, the control circuitry 304 executes a subroutine to initialize variables and prepare to search a database for a media fingerprint that matches a media fingerprint generated based on a media asset transmitted at a first time from a content source, which begins on line 805. For example, in some embodiments, control circuitry 304 may copy instructions from a non-transitory storage medium (e.g., storage device 308) into RAM or into the cache for processing circuitry 306 during the initialization stage.

At line 805, control circuitry 304 receives the media fingerprint generated based on a media asset transmitted at a first scheduled time from a content source. In some embodiments, this media fingerprint may be retrieved from storage 308.

At line 806, control circuitry 304 assigns variable "A" to the media fingerprint generated based on the media asset transmitted at the first scheduled time from the content source.

At line 807, control circuitry 304 may query a database for entries matching variable A. Depending on how the database is implemented and how variable A is stored, an intermittent step may be required to convert variable A into a form consistent with the database. In some embodiments, variable A may be encoded as a primitive data structure, and control circuitry 304 may submit variable A as a query to the database directly. After querying the database, control circuitry 304 may receive a database entry matching variable A. In some embodiments, control circuitry 304 may receive this entry in the form of a data-structure, an index of the database, or an index of another cross-referenced database.

At line 808, control circuitry 304 determines whether there is a database entry matching variable A. In some embodiments, control circuitry 304 determines this by checking if the database returned an empty data structure or a NULL value in response to the query in line 807. If there is a matching database entry the pseudo-code proceeds to line 809. If there were no matching database entries the pseudo-code instead proceeds to line 813.

At line 809, control circuitry 304 retrieves the matching entry from the database. For example, if control circuitry 304 retrieves an index after querying the database in line 807, control circuitry 304 may retrieve the database entry for the media fingerprint located at the received index. In some embodiments, the index may point to a larger data structure contained within the database, and control circuitry 304 may retrieve the media fingerprint from within the data structure using appropriate accessor methods. In some embodiments, control circuitry 304 retrieves the media fingerprint and stores it in a separate data structure locally (e.g., in storage 308) prior to proceeding further. After retrieving the media fingerprint the pseudo-code proceeds to line 810.

At line 810, control circuitry 304 executes a subroutine to identify the media asset corresponding to the matched fingerprint using processing circuitry. Afterwards, the pseudo-code may proceed to line 811.

At line 811, control circuitry 304 executes a termination subroutine. The termination subroutine may be executed in any manner consistent with termination subroutines describe above.

At line 813, control circuitry 304 executes a subroutine to mark the media fingerprint as associated with a new media asset using processing circuitry. Afterwards, the pseudo-code proceeds to line 815.

At line 815, control circuitry 304 executes a termination subroutine. The termination subroutine may be executed in any manner consistent with termination subroutines describe above.

It will be evident to one skilled in the art that the pseudo-code in FIG. 8 may be implemented in any number of programming languages and on a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. It is also understood that although we may describe control circuitry 304 interacting with a single database, this is only a single embodiment described for illustrative purposes, and the pseudo-code of FIG. 8 may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 10:
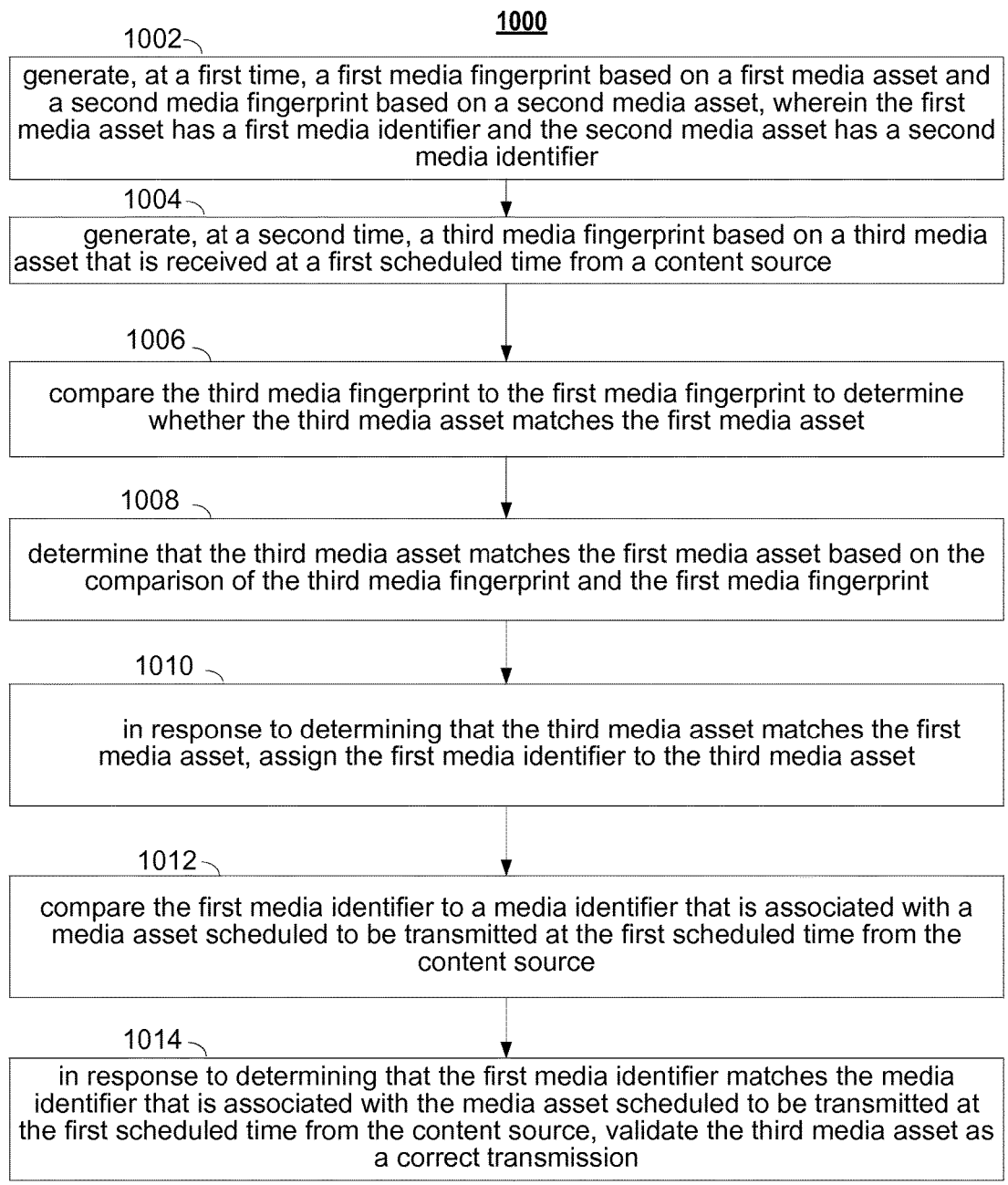
FIG. 10 depicts an illustrative process involved in validating a scheduled media asset, in accordance with some embodiments of this disclosure.

FIG. 10 depicts an illustrative process involved in validating that a scheduled media asset was in fact transmitted, in accordance with some embodiments of this disclosure. It should be noted that process 1000 or any action thereof could be performed on, or provided by, any of the devices shown in FIGS. 3-4. For example, process 1000 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more actions of process 1000 may be incorporated into or combined with one or more actions of any other process or embodiment (e.g., process 700 (FIG. 7)).

At step 1002, control circuitry 304 generates, at a first time, a first media fingerprint based on a first media asset and a second media fingerprint based on a second media asset, where the first media asset has a first media identifier and the second media asset has a second media identifier. Means of generating fingerprints may be consistent with any means described above.

At step 1004, control circuitry 304 generates, at a second time, a third media fingerprint based on a third media asset that is received at a first scheduled time from a content source. For example, control circuitry 304 may generate a media fingerprint based on a video by collecting a number of samples in a multitude of video frames of the video. The sampled data may represent digital data collected from specific two-dimensional points in the multitude of frames of the video. The collected data may then be organized into fingerprint data and stored in a data structure (e.g., an array). Specific methods for generating media fingerprints are described in greater detail in Zhang in U.S. Pat. No. 8,488,835 issued on Jul. 16, 2013, which are hereby incorporated by reference herein in their entirety.

At step 1006, control circuitry 304 compares the third media fingerprint to the first media fingerprint to determine whether the third media asset matches the first media asset. For example, the data structures created in the above example may be compared for similarity in order to determine whether two fingerprints represent the same video.

At step 1008, control circuitry 304 determines that the third media asset matches the first media asset based on the comparison of the third media fingerprint and the first media fingerprint.

At step 1010, control circuitry 304, in response to determining that the third media asset matches the first media asset, assigns the first media identifier to the third media asset. Control circuitry 304 may assign the first media identifier to the third media asset by creating a link in storage 308 between the third media asset and the first media identifier.

At step 1012, control circuitry 304 compares the first media identifier to a media identifier that is associated with a media asset scheduled to be transmitted at the first scheduled time from the content source. Control circuitry 304 may use a direct string comparison to compare the two media identifiers.

At step 1014, control circuitry 304, in response to determining that the first media identifier matches the media identifier that is associated with the media asset scheduled to be transmitted at the first scheduled time from the content source, validates the third media asset as a correct transmission. For example, control circuitry 304 may create a record and store it in storage 308 that validation was successful.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Furthermore, it should be noted that any of the devices or equipment discussed in relation to FIGS. 3-4 could be used to perform one or more of the actions in FIG. 10.

Figure 11:
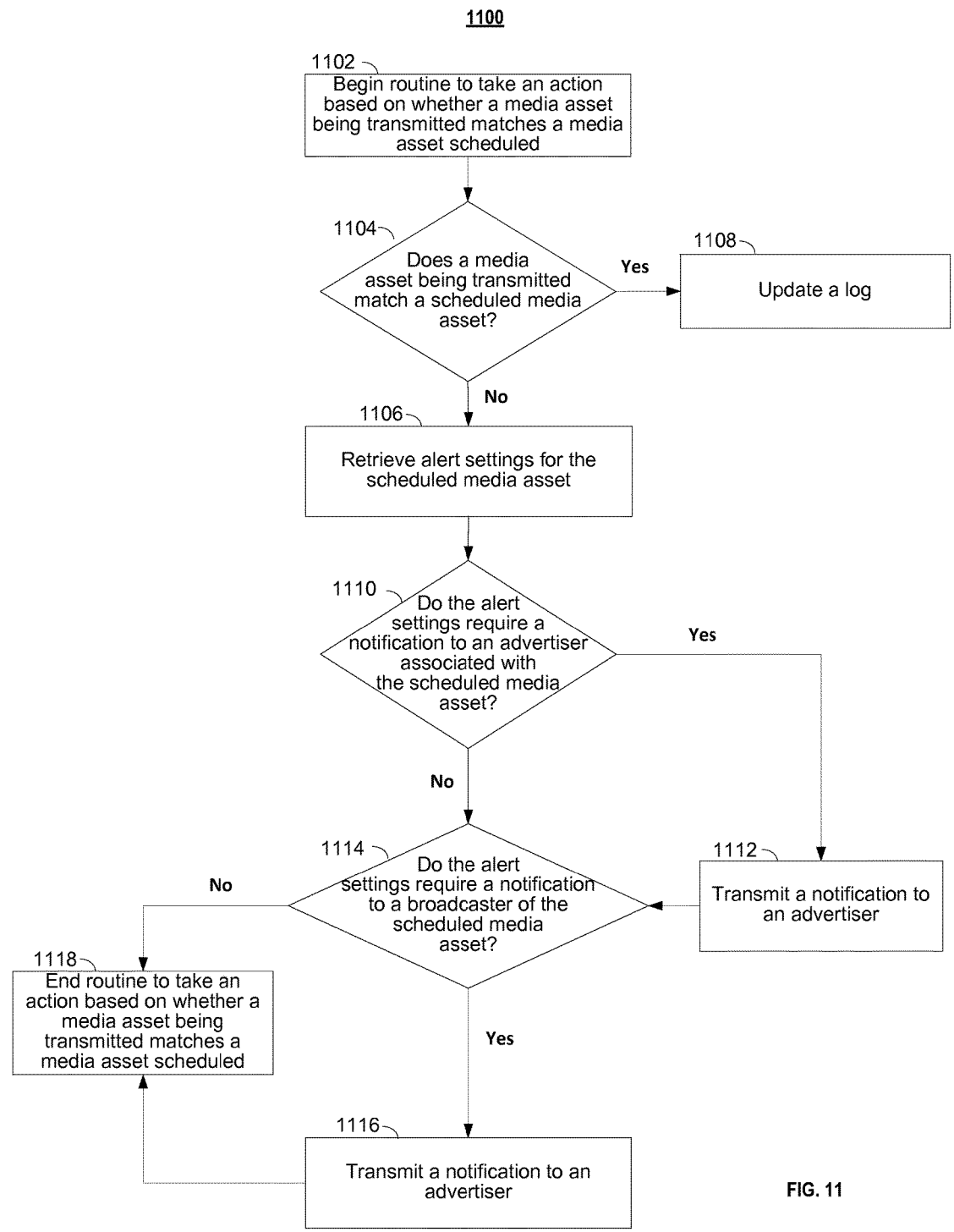
FIG. 11 depicts an illustrative process involved in determining which actions to take based on whether a media asset being transmitted matches a media asset scheduled, in accordance with some embodiments of this disclosure.

FIG. 11 depicts illustrative processes involved in taking an action(s) based on whether a media asset being transmitted matches a media asset scheduled. It should be noted that process 1100 or any action thereof could be performed on, or provided by, any of the devices shown in FIGS. 3-4. For example, process 1000 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more actions of process 1100 may be incorporated into or combined with one or more actions of any other process or embodiment (e.g., process 700 (FIG. 7), process 1000 (FIG. 10)).

At step 1102, control circuitry 304 begins the routine to take an action based on whether a media asset being transmitted matches a media asset scheduled.

At step 1104, control circuitry 304 determines whether a media asset being transmitted matches a scheduled media asset. Means of determining may be consistent with any means described above.

At step 1108, in response to a successful validation, control circuitry 304 updates a log. A log may reside locally on the same device where control circuitry 304 resides and may be stored in storage 308. The log may reside at media content source 416 or at media guidance data source 418.

At step 1106, in response to unsuccessful validation, control circuitry 304 retrieves alert settings for the scheduled media asset. The alert settings may be stored on the same device as control circuitry 304 in storage 308. The alert settings may be stored in a file (e.g., an XML file) or in a database.

At step 1110, control circuitry 304 determines whether the alert settings require a notification to an advertiser associated with the scheduled media asset. For example, alert settings may require an email to be sent to an advertiser about the validation failure.

At step 1112, control circuitry 304, if the alert settings require a notification to an advertiser, transmits a notification to an advertiser.

At step 1114, control circuitry 304 determines whether the alert settings require a notification to a broadcaster of the scheduled media asset. If the alert settings require a notification to a broadcaster of the scheduled media asset, control circuitry 304 transmits the notification at step 1116. A notification may be an email or an SMS message. The process then moves to step 1118.

At step 1118, control circuitry 304 ends the routine to take an action based on whether a media asset being transmitted matches a media asset scheduled.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Furthermore, it should be noted that any of the devices or equipment discussed in relation to FIGS. 3-4 could be used to perform one or more of the actions in FIG. 11.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for validating scheduled content, the method comprising:

generating, using a control circuitry, at a first time, a first media fingerprint based on a first media asset and a second media fingerprint based on a second media asset, wherein the first media asset has a first media identifier and the second media asset has a second media identifier;

populating, using the control circuitry, a database with a first record for the first media asset, wherein the first record includes a first field for the first media fingerprint and a second field for the first media identifier;

generating, using the control circuitry, at a second time, a third media fingerprint based on a third media asset that is received at a first scheduled time from a content source;

comparing, using the control circuitry, the third media fingerprint with the first media fingerprint to determine whether the third media asset matches the first media asset, wherein the comparing comprises:
identifying the first record in the database based on a value in the second field;
retrieving the first record from the database; and
extracting the first media fingerprint from the first field;

determining, using the control circuitry, that the third media asset matches the first media asset based on the comparison of the third media fingerprint and the first media fingerprint;

in response to determining that the third media asset matches the first media asset, generating, using the control circuitry, a third media identifier for the third media asset by assigning the first media identifier as the third media asset identifier;
receiving, using the control circuitry, program guide information comprising a list of media asset identifiers that identify a respective plurality of media assets scheduled to be transmitted from the content source at the first scheduled time;
analyzing, using the control circuitry, the list of media asset identifiers to determine that the third identifier, assigned to the third media asset which has been received at the first scheduled time, matches a fourth media identifier from the list of media assets identifiers that identifies a media asset scheduled to be transmitted at the first scheduled time from the content source;
determining, using the control circuitry, based on the third identifier of the third media asset matching the fourth media identifier, whether the third media asset was scheduled to be transmitted at the first scheduled time; and
in response to determining that the third media asset was scheduled to be transmitted at the first scheduled time, storing, using the control circuitry, an indication that the media asset scheduled to be transmitted at the first scheduled time from the content source was transmitted at the first scheduled time from the content source.

2. The method of claim 1, further comprising:
in response to determining that the third media fingerprint does not match the first media fingerprint, comparing the third media fingerprint with the second media fingerprint to determine whether the third media asset matches the second media asset.

3. The method of claim 2, further comprising:
in response to determining that the third media fingerprint does not match the second media fingerprint, designating the third media asset as a new media asset.

4. The method of claim 1, wherein generating the third media fingerprint for the third media asset further comprises generating an alphanumeric character that uniquely identifies media content having a common characteristic.

5. The method of claim 1, wherein the common characteristic includes a series episode number and a title, or a serial number.

6. The method of claim 1, wherein generating the third media fingerprint for the third media asset further comprises generating an alphanumeric character that uniquely identifies media content based on an object appearing in the third media asset.

7. The method of claim 1, wherein generating the third media fingerprint for the third media asset further comprises generating an alphanumeric character that uniquely identifies media content having common metadata.

8. The method of claim 1, further comprising transmitting a validation of the third media asset to a remote source.

9. A system for validating scheduled content, the system comprising:
storage; and
control circuitry that:
generates, at a first time, a first media fingerprint based on a first media asset and a second media fingerprint based on a second media asset, wherein the first media asset has a first media identifier and the second media asset has a second media identifier;
populates, a database with a first record for the first media asset, wherein the first record includes a first field for the first media fingerprint and a second field for the first media identifier
generates, at a second time, a third media fingerprint based on a third media asset that is received at a first scheduled time from a content source;
compares the third media fingerprint with the first media fingerprint to determine whether the third media asset matches the first media asset, wherein the control circuitry when comparing the third media fingerprint with the first media fingerprint:
identifies the first record in the database based on a value in the second field,
retrieves the first record from the database, and
extracts the first media fingerprint from the first field;
determines that the third media asset matches the first media asset based on the comparison of the third media fingerprint and the first media fingerprint;
in response to determining that the third media asset matches the first media asset, generates a third media identifier for the third media asset by assigning the first media identifier as the third media asset identifier;
receives program guide information comprising a list of media asset identifiers that identify a respective plurality of media assets scheduled to be transmitted from the content source at the first scheduled time;
analyzes the list of media asset identifiers to determine that the third media identifier, assigned to the third media asset which has been received at the first scheduled time, matches a fourth media identifier from the list of media assets identifiers that identifies a media asset scheduled to be transmitted at the first scheduled time from the content source;
determines, based on the third media identifier of the third media asset matching the fourth media identifier, whether the third media asset was scheduled to be transmitted at the first scheduled time; and
in response to determining that the third media asset was scheduled to be transmitted at the first scheduled time, stores an indication that the media asset scheduled to be transmitted at the first scheduled time from the content source was transmitted at the first scheduled time from the content source.

10. The system of claim 9, wherein the control circuitry:
in response to determining that the third media fingerprint does not match the first media fingerprint, compares the third media fingerprint with the second media fingerprint to determine whether the third media asset matches the second media asset.

11. The system of claim 10, wherein the control circuitry:
in response to determining that the third media fingerprint does not match the second media fingerprint, designates the third media asset as a new media asset.

12. The system of claim 10, wherein the control circuitry when, generating the third media fingerprint for the third media asset to, generates an alphanumeric character that uniquely identifies media content having a common characteristic.

13. The system of claim 10, wherein the common characteristic includes a series episode number and a title, or a serial number.

14. The system of claim 10, wherein the control circuitry, when generating the third media fingerprint for the third media asset to, generates an alphanumeric character that uniquely identifies media content based on an object appearing in the third media asset.

15. The system of claim 10, wherein the control circuitry, when generating the third media fingerprint for the third media asset, generates an alphanumeric character that uniquely identifies media content having common metadata.

16. The system of claim 10, wherein the control circuitry transmits a validation of the third media asset to a remote source.

\* \* \* \* \*